Dec. 14, 1926.                                                  1,611,129
                        J. T. JANETTE
                          BEARING
                      Filed Nov. 9, 1921

Witness:
Uncolwa

Inventor:
John T. Janette.
By Glenn S. Noble  Atty.

Patented Dec. 14, 1926.

1,611,129

UNITED STATES PATENT OFFICE.

JOHN T. JANETTE, OF CHICAGO, ILLINOIS.

BEARING.

Application filed November 9, 1921. Serial No. 513,883.

This invention relates more particularly to bearings which are adapted to be used on electric motors and which may be supplied with sufficient lubricant so that the motor may operate for a considerable length of time without being oiled. The objects of this invention are to provide an improved type of bearing having means for supplying lubricant to the same; to provide a bearing for motors which may be readily assembled and which contains comparatively few parts; and in general to provide such an improved construction as will be described more fully hereinafter. In the accompanying drawings illustrating a preferred form of this invention—

Figure 1:
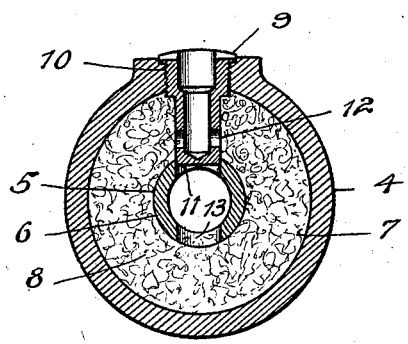
Figure 1 is a cross sectional view.
Figure 2:
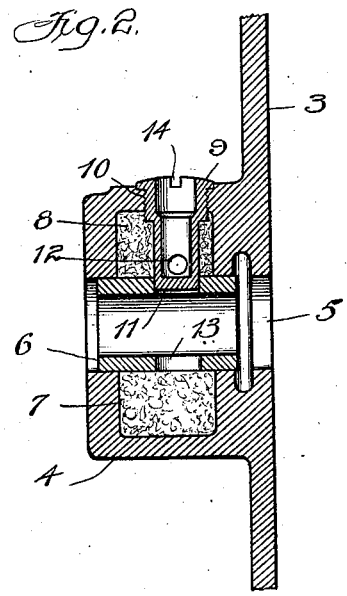
Figure 2 is a longitudinal sectional view.

In the device as shown in these drawings, 3 represents the side of the motor frame or casing and has the bearing 4 formed integrally therewith. The bearing has a hole 5 for receiving the sleeve 6 which engages with the motor shaft. The bearing is formed with an annular chamber 7 around the sleeve 6 which chamber is filled with any suitable absorbent material 8 such as felt or the like. A hollow plug or tubing 9 engages with a threaded hole 10 in the top of the bearing and extends down into a hole 11 in the top of the sleeve 6. The lower end of the cap or plug 9 is closed and one or more holes 12 are provided in the sides of the plug adjacent to the bottom to permit the oil to run out into the chamber 7. The sleeve 6 is also provided with one or more holes 13 at the bottom thereof so that the oil may pass up into the sleeve. The cap or plug 9 is provided with slots 14 for engagement by a screw driver and a cork or closure may be applied thereto as desired.

When the parts are to be assembled, the sleeve 6 is placed in position and fits closely in the hole 5. A pin or rod is inserted through the hole 10 and through the holes 11 and 13 so as to bring the hole 11 in proper position to receive the plug 9. The felt 8 is pressed in around the sleeve and a hole is left therethrough for receiving the plug which is then inserted and brought into engagement with the sleeve thereby serving to hold the sleeve in proper position. It will be apparent that when the chamber has been filled with oil, the oil will be fed through the hole 13 to the bearing and will serve to lubricate the motor shaft for a long period of time. It will also be noted that the construction may be modified for different types of motors or for different bearings and therefore I do not wish to be limited to the exact construction herein shown and described, except as pointed out in the following claims.

I claim:

1. The combination with a bearing having a chamber therein, of a sleeve passing through the chamber and having diametrically opposite holes, absorbent material in said chamber and a hollow plug extending downwardly through the bearing and engaging with the upper hole in the sleeve, said plug having a closed bottom and having lateral holes above the sleeve.

2. The combination with a motor bearing having a chamber therein, of a sleeve through the bearing for receiving the shaft, said sleeve having one or more lateral holes therethrough, absorbent material filling the chamber around the sleeve, means for introducing a lubricant to the absorbent material, said means comprising a hollow plug which passes through the bearing and engages with a hole in the sleeve and which is closed at its inner end.

3. A bearing comprising an annular chamber with a hole therethrough, a sleeve in said hole for engagement with a shaft, said sleeve having diametrically opposite holes, felt in said chamber, a hollow plug extending down through the top of the chamber and engaging with the upper hole in said sleeve, said plug having lateral openings adjacent to the sleeve.

4. The combination of a hollow bearing having a threaded hole in the top thereof, a bushing in said bearing having one or more lateral holes therethrough, a hollow plug in said threaded hole, said plug having a closed bottom and engaging with the upper hole through the bushing, said plug also having lateral holes adjacent to the bottom and absorbent material filling the bearing around the bushing and plug.

JOHN T. JANETTE.